United States Patent
Neal

[15] 3,688,954
[45] Sept. 5, 1972

[54] SPARE TIRE HOLDER

[72] Inventor: Owen H. Neal, 9 Bonneville Drive, Council Bluffs, Iowa 51501

[22] Filed: April 30, 1970

[21] Appl. No.: 33,334

[52] U.S. Cl. .................................................. 224/42.24
[51] Int. Cl. ............................................. B60r 27/00
[58] Field of Search..224/42.12, 42.24, 42.25, 42.46, 224/42.46 A, 42.46 B, 42.45, 42.33, 42.35, 42.06

[56] References Cited

UNITED STATES PATENTS

| 1,629,478 | 5/1927 | Clark | 224/42.12 |
|---|---|---|---|
| 2,701,670 | 2/1955 | Hutchinson | 224/42.24 |
| 2,621,837 | 12/1952 | Etbauer | 224/42.24 |
| 2,772,826 | 12/1956 | Krengel | 224/42.24 |
| 2,585,231 | 2/1952 | Dorsey | 224/42.46 |
| 2,915,082 | 12/1959 | Shaw | 224/42.45 |

Primary Examiner—Gerald M. Forlenza
Assistant Examiner—Jerold M. Forsberg
Attorney—Zarley, McKee & Thomte

[57] ABSTRACT

A spare tire holder for use with a pick-up camper to permit the spare tire to be removably mounted at either side of the pick-up. The holder comprises a frame means having an upper end which extends over the upper end of the pick-up bed and which is secured thereto. The frame means also includes a frame portion which extends downwardly from the upper end of the frame means along the outside surface of the bed side wall. A plurality of bolt members extend outwardly from the frame portion for supporting the spare tire thereon. A pad means is positioned between the frame means and the bed to prevent the frame means from damaging the pick-up.

6 Claims, 5 Drawing Figures

PATENTED SEP 5 1972  3,688,954

INVENTOR
OWEN H. NEAL
BY
Zarley, McKee & Thomte
ATTORNEYS

SPARE TIRE HOLDER

The spare tire holders for pick-up trucks are usually located beneath the rear end of the pick-up box or in the box itself. A few trucks provide a stationary spare tire mount at one side thereof forwardly of the rear wheel. A problem arises when a camper is mounted or placed in the truck box. If the spare tire is mounted within the box, it must obviously be removed therefrom to facilitate the positioning of the camper therein. If the spare tire is mounted beneath the rearward end of the truck box, the spare tire must also be removed since a large majority of the campers extend behind the rearward end of the truck and would make it practically impossible to remove the spare tire if needed. Further, a spare tire, in such a location, becomes caked with mud, dirt, etc. If the spare tire is mounted in the stationary mount at the side of the truck, it must also be removed since the camper cannot be mounted in the box when the spare tire is in such a position.

A common solution to the problem has been to position or mount the spare tire forwardly of the truck grill or radiator. When so positioned, the spare tire seriously restricts the flow of air through the radiator which causes the truck engine to overheat.

Therefore, it is a principal object of this invention to provide a spare tire holder for use with a pick-up camper.

A further object of this invention is to provide a spare tire holder which may be mounted at either side of the truck.

A further object of this invention is to provide a spare tire holder for use with a pick-up camper which is easily removably mounted thereon.

A further object of this invention is to provide a spare tire holder for use with a pick-up camper which does not interfere with the positioning of the camper in the pick-up box.

A further object of this invention is to provide a spare tire holder for use with a pick-up camper which does not interfere with the flow of air through the radiator.

A further object of this invention is to provide a spare tire holder for use with a pick-up camper which is adjustable to fit various types of pick-up boxes.

A further object of this invention is to provide a spare tire holder for use with a pick-UP camper having means thereon to prevent damage to the pick-up.

A further object of this invention is to provide a spare tire holder for use with a pick-up camper having means thereon which prevents the unauthorized removal of the holder from the truck.

A further object of this invention is to provide a spare tire holder which provides a rigid mount for the spare tire at one side of the truck.

A further object of this invention is to provide a spare tire holder which is economical to manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

Figure 1:
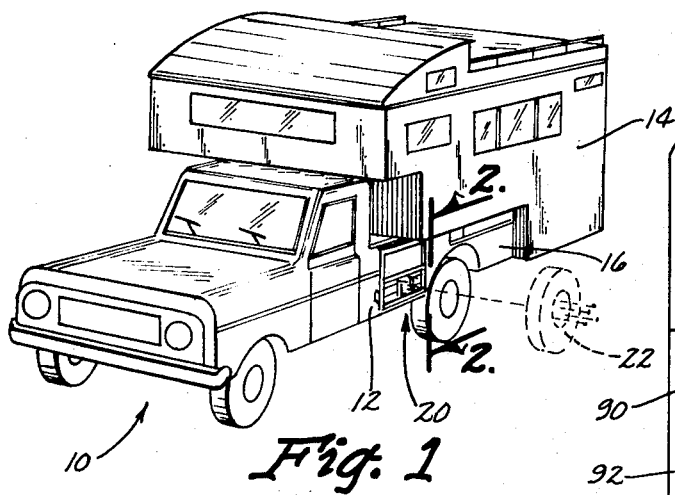
FIG. 1 is a front perspective view of a pick-up camper having the holder of this invention mounted at one side thereof.
Figure 2:
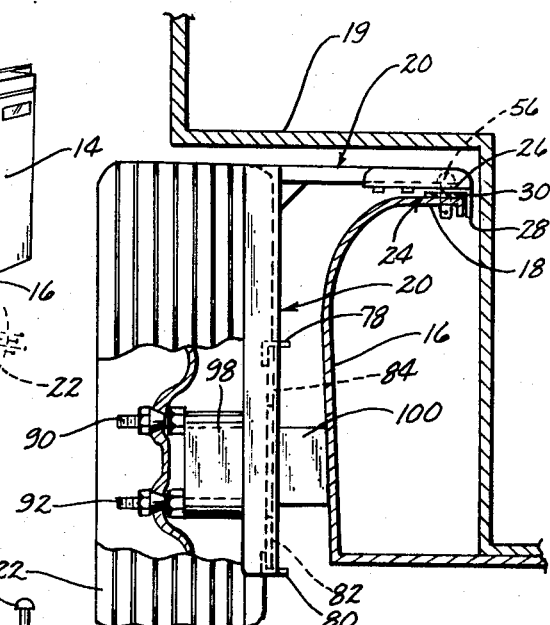
FIG. 2 is an enlarged fragmentary sectional view as seen along lines 2—2 of FIG. 1.

The numeral 10 generally refers to a pick-up truck having a box or bed 12 adapted to receive a camper 14 therein. Box 12 includes upstanding side walls 16 and 16' [not shown] at opposite sides thereof, each of which have a horizontal top portion 18 at the upper end thereof. Camper 14 includes a horizontal portion 19 which extends outwardly over the upper end of wall 16 and also includes a horizontal portion [not shown] which extends outwardly over the upper end of side wall 16'.

The spare tire holder of this invention is referred to by the reference numeral 20 for supporting a spare tire 22 outwardly of side wall 16. Holder 20 comprises an elongated angle 24 including a horizontal portion 26 and a vertical portion 28 extending downwardly from the inner end thereof. A resilient strip 30, preferably foam rubber, is secured to the underside of horizontal portion 26 by a suitable adhesive or the like to prevent the angle 24 from marring the paint on top portion 18 of side wall 16 and to prevent rattling problems.

Figure 3:
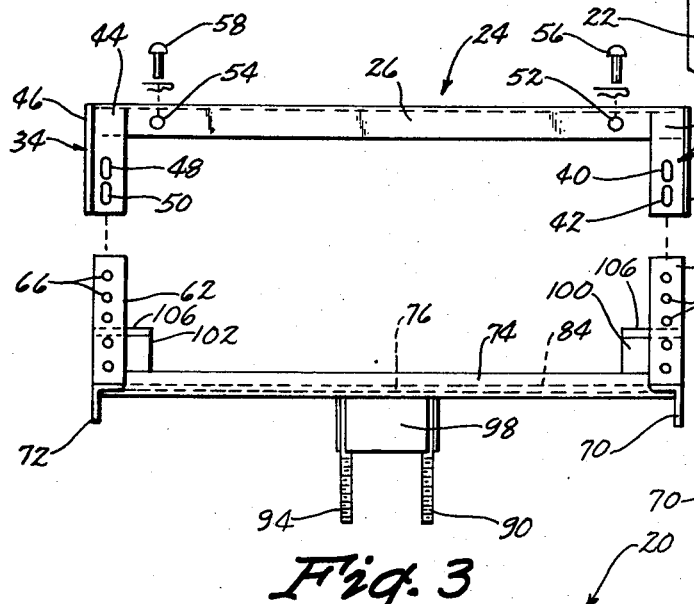
FIG. 3 is an exploded top view of the holder of this invention.
Figure 5:
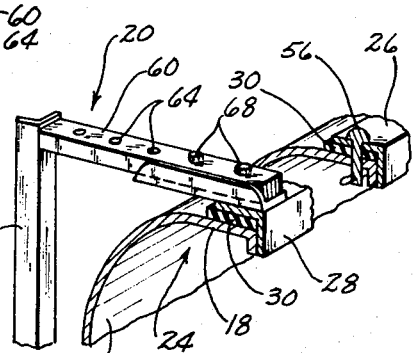
FIG. 5 is a fragmentary rear perspective view illustrating the relationship of the holder and the pick-up box.

Brackets 32 and 34 are secured to the opposite ends of angle 24 by welding and extend horizontally outwardly therefrom. Bracket 32 comprises a horizontal portion 36 and a vertical portion 38 extending upwardly from the side thereof. As seen in FIG. 3, horizontal portion 36 has a pair of elongated slots 40 and 42 formed therein. Bracket 34 includes horizontal portion 44, vertical portion 46 and slots 48 and 50. As also seen in FIG. 3, horizontal portion 26 of angle 24 has spaced apart openings 52 and 54 formed therein for receiving pins 56 and 58 therein respectively.

The numerals 60 and 62 designate bars which are adapted to be selectively adjustably secured to brackets 32 and 34 respectively. Bar 60 has a plurality of openings 64 formed therein, each of which are adapted to register with one of the slots 40 or 42 in bracket 32. Bar 62 has a plurality of openings 66 formed therein, each of which are adapted to register with one of the slots 48 or 50. Suitable bolt members 68 extend through the openings and slots to maintain bars 60 and 62 in the desired relationship with respect to brackets 32 and 34 to permit the holder to be used on a variety of different trucks.

Figure 4:
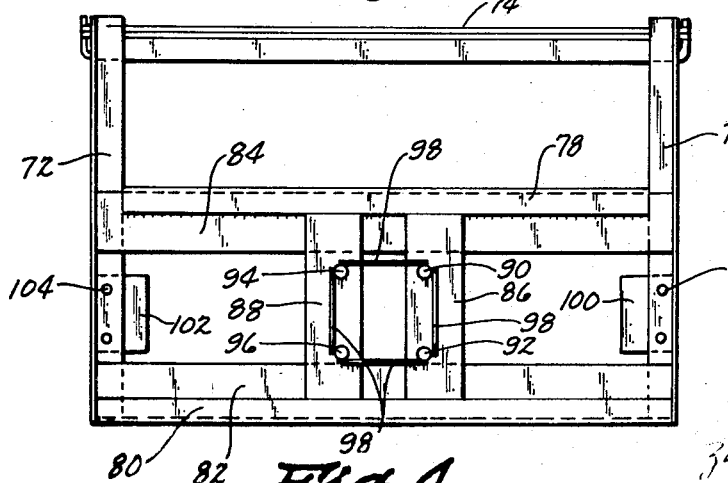
FIG. 4 is a front elevational view of the holder of this invention.

Angles 70 and 72 are secured to the outer ends of bars 60 and 62 respectively and extend downwardly therefrom as illustrated in the drawings. Supports 74 and 76 are secured to and extend between angles 70 and 72 as illustrated in FIG. 3. Angles 78 and 80 are secured to and extend between angles 70 and 72 in a spaced apart relationship as seen in FIG. 4. Brace 82 is secured to and extends between the lower ends of angles 70 and 72 with brace 84 being secured to and extending between angles 70 and 72 adjacent angle 76.

Plates 86 and 88 are welded or otherwise secured to braces 82 and 84 in a spaced relationship best seen in FIG. 4. Plate 86 has bolts 90 and 92 mounted thereon which extend horizontally outwardly therefrom. Bolts 94 and 96 extend outwardly from plate 88 as shown in FIG. 4. Reinforcing plates 98 are secured to the bolts 90, 92, 94 and 96 in the manner illustrated in FIGS. 3 and 4. Preferably, two nuts should be used on each of the bolts 90, 92, 94 and 96.

Resilient bump pads 100 and 102 are secured to supports 70 and 72 respectively above the lower ends thereof by any convenient means such as screws 104. The pads have an inner surface 106 which may be scribed and cut to conform to the contour of the exterior surface of the side wall 16 so as to be complimentary in shape thereto.

The holder may be mounted at either side of the vehicle with the pins 56 and 58 being extended downwardly through the angle 26 and the upper portion of the truck box to maintain the holder thereon. Preferably, the length of the pins 56 and 58 is such that it would be impossible for a person to pull the pins upwardly since the portion 19 of the camper would prevent the same. Additionally, the fact that spring clips are provided on the lower ends of the pins makes the unauthorized removal of the holder considerably difficult.

The holder is easily and quickly mounted at either side of the truck and does not interfere with the camper in any way. The holder may be horizontally adjusted as previously described to permit the holder to be used on various trucks. The tightening of the nuts on the bolts 90, 92, 94 and 96 draws the tire 22 into engagement with the holder to prevent rattling of the wheel as the truck is being operated. The holder is extremely strong and durable and provides a convenient mean for mounting and demounting the spare tire for the truck and is easily removed after the camper unit is removed, without altering the structure of the truck.

Preferably, a hub cap (not shown) is secured to the spare tire in conventional fashion after the tire is mounted on the holder 20. The hub cap eliminates exposure of the lug nuts and bolts. The only alteration required on the truck to receive the holder is to drill the two ½-inch holes in the upper horizontal top portion 18 of the box to facilitate the insertion of pins 56 and 58 therethrough.

Since the holder is easily removed from the truck, the spare tire may be placed within the box when the camper is not being used. Thus it can be seen that the holder accomplishes at least all of its stated objectives.

I claim:

1. In combination with a pick-up truck having a bed portion including upstanding side walls, a camper means mounted in said bed portion including a horizontal portion extending outwardly over said upstanding side walls, comprising,
    a spare tire holder comprising a frame means having upper and lower ends, the upper end of said frame means being operatively secured at its upper end to one of said side walls at the upper end thereof, said frame means extending downwardly from its upper end outwardly of the outside surface of said one side wall, and a bolt means secured to said frame means below the upper end thereof adapted to detachably receive and support a spare tire thereon so that the upper end of the spare tire will be at least partially positioned below said horizontal portion of said camper means,
    said frame means comprising first and second spaced apart horizontal frame members having inner and outer ends, the inner ends of said first and second frame members being secured to said side wall, third and fourth frame members extending downwardly from the outer ends of first and second frame members respectively, a support means secured to and extending between said third and fourth frame members adjacent the lower end thereof, said bolt means comprising a plurality of spaced apart bolt members secured to said support means and extending outwardly therefrom.

2. The combination of claim 1 wherein an elongated angle member is secured to and extends between the inner ends of said first and second frame members, said angle member including a vertical portion extending downwardly adjacent the upper inside surface of said side wall.

3. The combination of claim 2 wherein a pin means extends downwardly through said angle member into said side wall, said pin means having a length sufficient to prevent said pin means from being removed from said angle member when said horizontal portion of said camper means is positioned thereover.

4. A spare tire holder for a pick-up truck having a bed portion including upstanding side walls,
    a frame means comprising a first frame portion having inner and outer ends, a second frame portion secured to the outer end of said first portion extending downwardly therefrom and having upper and lower ends,
    said inner end of said first frame portion extending over the upper end of one of said side walls,
    means removably securing said inner end of said first frame portion to the upper end of said side wall,
    a bolt means secured to said second frame portion below the upper end thereof for detachably receiving and supporting a spare tire thereon,
    and a pad means on said second frame portion for engaging the outside surface of said side wall and which is maintained in engagement therewith by the weight of the frame means and the spare tire,
    said first frame portion comprising first and second spaced apart horizontal frame members having inner and outer ends, the inner ends of said first and second frame members being secured to said side wall, said second frame portion comprising third and fourth frame members extending downwardly from the outer ends of first and second frame members respectively, a support means secured to and extending between said third and fourth frame members adjacent the lower end thereof, said bolt means comprising a plurality of spaced apart bolt members secured to said support means and extending outwardly therefrom.

5. The spare tire holder of claim 4 wherein an elongated angle member is secured to and extends between the inner ends of said first and second frame members, said angle member including a vertical portion extending downwardly adjacent the upper inside surface of said side wall.

6. The spare tire holder of claim 4 wherein said first and second spaced apart frame members are length adjustable.

* * * * *